March 6, 1934.  S. J. SLOTSKY  1,949,846
JUNCTION BOX
Filed July 21, 1931
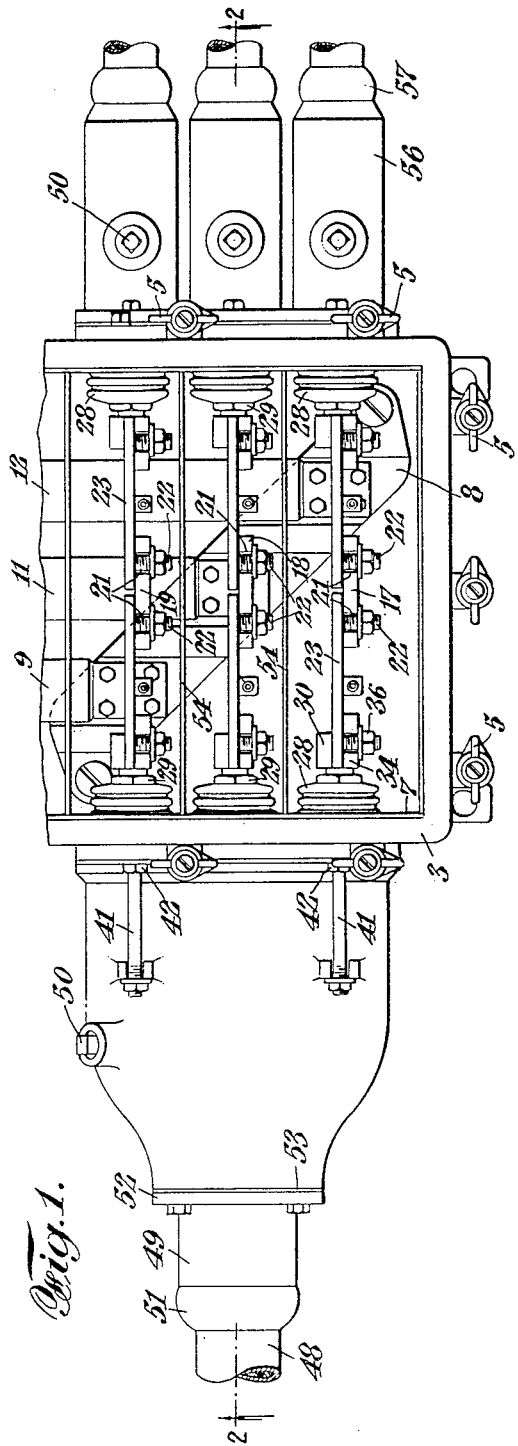
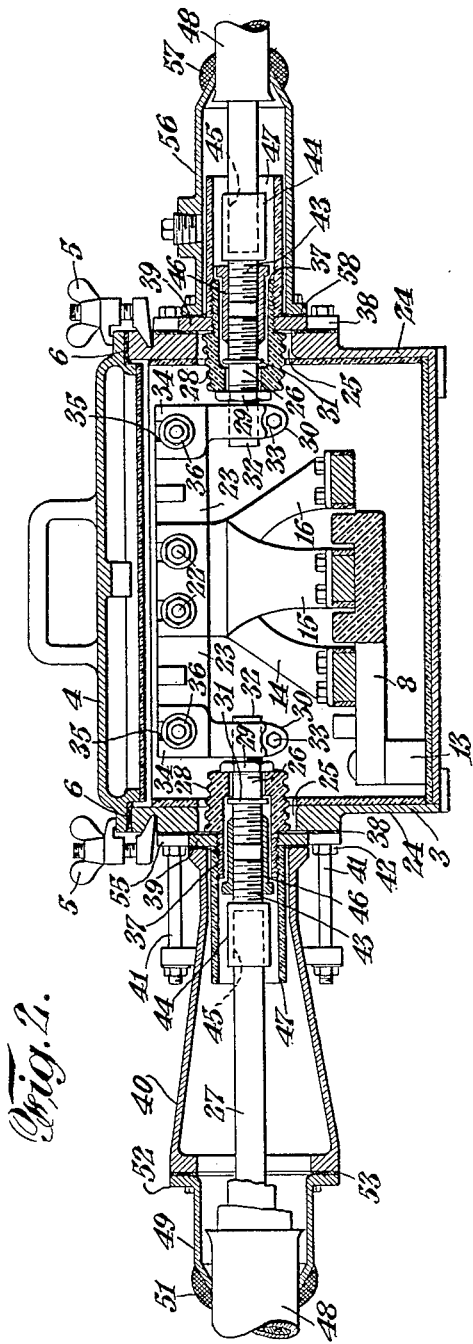
INVENTOR
Samuel J. Slotsky
BY
ATTORNEYS Patented Mar. 6, 1934

1,949,846

UNITED STATES PATENT OFFICE 1,949,846

JUNCTION BOX

Samuel J. Slotsky, Pittsburgh, Pa., assignor to Anaconda Wire and Cable Company, a corporation of Delaware Application July 21, 1931, Serial No. 552,166

5 Claims. (Cl. 247—14)

My invention relates to junction boxes and particularly to connecting means for releasably supporting cable thereto.

One object of my invention is to provide a junction box, from which an insulated connector stud extends, with a detachable conductor terminal to which an end of a cable may be attached and releasably connected to the stud, exterior of said box.

Another object of my invention is to provide cable connectors for junction boxes, having the above noted characteristics which may readily connect and disconnect a cable to a stud projecting from the box without disturbing conducting members within the box.

A further object of my invention is to provide a turnbuckle connector for joining a cable to a stud of a junction box, with a casing which is capable of retaining a fluid for insulating the joint and cable ends.

Numerous other objects and features of novelty of my invention will be either specifically pointed out or will become apparent when referring, for a better understanding of my invention, to the following description in conjunction with the accompanying drawing, wherein;

Figure 1 is a broken plan view of a junction box embodying features of my invention, and Fig. 2 is a sectional view of the structure shown in Fig. 1 taken on the line II—II thereof.

Referring to the drawing, the junction box includes a metal housing 3 having the top or one side open and provided with a cover 4 which is secured to the housing by wing nuts 5. The joint between the cover and the housing is rendered gas tight by a packing gasket 6.

The inner walls of the housing are lined with insulating material 7 for preventing the contacting of live conductors with the walls. Within the housing three feeder buses 9, 11, and 12 are mounted in fixed space relation to each other on an insulating member 8 which is spaced from the bottom of the housing by the bosses 13.

The buses are connected, at the broken end of the housing, to feeder conductors (not shown) by connectors which are similar to those employed for connecting the distribution cables to the buses, and which will now be described in detail.

As shown in Fig. 2, upstanding conductor elements 14, 15 and 16 are conductively mounted on the buses 9, 11 and 12, respectively, each having a contact portion 17, 18 and 19, respectively, disposed centrally of the housing. Each contact portion may be provided with two slots 21 for receiving threaded studs or bolts 22 which serve to clamp one end of connecting links 23 to the elements 14, 15 and 16.

The side walls 24 of the housing are provided with openings 25 through which terminal studs 26 extend to be joined to cables 27. Each stud 26 is secured within a hollow insulating bushing 28, by a threaded nut 29 which draws the flange 31 of the stud into clamping engagement with the end wall of the bushing. Each stud is provided with a projection 32 which is engaged by a split terminal clamp 30 having a clamping bolt 33 which draws the jaws of the clamp into firm conductive engagement with the projection. The clamp is provided with a contact head 34 having a slot 35 therein for receiving a clamping bolt 36 which retains one end of the link 23 in conductive engagement therewith.

The insulating bushing 28 is provided with a reduced threaded portion 37, on which a plate 39 is screwed and forced into sealed engagement with a gasket 38 provided on the outer face of the side wall 24. The gasket 38 is supported on the wall by the side plates 55 which are retained by studs 41 and clamping nuts 42 in fixed relation to the wall.

Each cable 27 is provided with a threaded connector stud 43 having an enlarged portion 44 which is recessed to form a socket 45 into which the end of the cable is supported by brazing, soldering or other suitable means. The end of the stud 43 is threaded in a direction opposite to that of the stud 26 and is supported in conductive relation therewith by a turnbuckle nut 46 which is provided with right and left handed threads corresponding to those of the studs.

An insulating sleeve 47 is threaded upon the threaded portion 37 of the bushing 28 for encompassing the exposed portions of the stud 43 and the turnbuckle nut 46 for the purpose of insulation.

A bell 40 is provided on one side of the box, of sufficient width, as indicated in Fig. 1, to enclose three spaced cables and their respective connectors and bushings. The cables extend from a single tubular casing 48, which may be a lead sheet, to which a nipple 49 is sealed by a joint 51. The nipple 49 is provided with a flange 52 which is connected to the outer end of the bell against a washer or gasket 53 which seals the connection.

Individual bells 56 are provided over each of the three cables and their respective connectors and bushings, on the opposite side of the box to that on which the single bell 40 is mounted. The ends of the bells are sealed directly to the sheath 48 of the cables by the joints 57. The bells abut against the gasket 58 which is provided on the front surface of the plate 39, to force the plates against the gasket 38 to provide a complete seal for the box.

Links 23 are employed to connect a set of cables to their respective feeder buses, one end being secured to the conductor element 14, 15 or 16, the other end being connected to a contact head 34 disposed in alinement with the element.

The sheath is cut from the cable ends and the terminal studs 43 are secured thereto in the above noted manner. The insulating sleeve 47 is slid over the end of the cable and the studs 43 and 26 are then joined by the turnbuckle nut 46. The sleeve 47 is then threaded upon the threaded portion 37 of the bushing 28 to protect the exposed parts of the connection and the cables from contacting with the bells or housing. After the connection is thus made, the bell is clamped to the housing with the inner ends thereof forming a seal with the plate 39 which is drawn against the gasket 38. The nipple 49 is then secured to the bell 40 by the flange 52 and the joint 51 is then made between the nipple and the sheath. The bell is then filled with oil or other insulating fluid through an aperture which is then closed by a screw plug 50.

The sleeve 47 insulates the several cables and their connecting joints and the connecting links within the junction box are insulated from one another by means of insulating partitions or barriers 54.

Since the junction box and bells are oil and gas tight and filled with oil or a suitable insulating material, and since the different phase conductors are insuated from one another by sleeves and barriers, the conductors may be disposed in closer relation than would be permissible in junction boxes having air insulation, and consequently the over-all dimensions of the junction box and associated bells are materially reduced.

It will thus be seen that I have provided a simple and compact junction box wherein cables may be quickly and efficiently connected to terminal studs extending from within the box and that the terminal studs may be connected by detachable links to any desired bus.

While I have described and illustrated but a single embodiment of my invention it will be apparent to those skilled in the art that various changes, omissions, additions and substitutions may be made therein without departing from the spirit and scope of my invention as set forth in the appended claims.

I claim as my invention:

1. A junction box for electric cables including in combination, a housing for conductors having an opening in a wall thereof, a threaded stud connected to a conductor within the housing and extending through said opening, a stud attachable to a cable having an end threaded in a direction opposite to that of the first said stud, a turn buckle threaded in opposite directions and cooperating with the threaded portions of the two said studs for drawing them into fixed conductive engagement, insulating means extending from the interior of said housing and encompassing the studs and the turn buckle and a bell enclosing said insulating means and secured at one end to said housing about said opening and at the other end to said cable and constituting a liquid tight seal with said housing for enclosing said opening.

2. A junction box for electric cables including in combination, a housing for enclosing conductors and having openings in a wall thereof, hollow insulators extending through said openings, a conductor terminal extending through each of said insulators and secured in fixed relation thereto, a stud for engaging an end of a cable, detachable connectors for joining said studs to said terminals and a plurality of insulating sleeves detachably secured to said insulators and extending over said detachable connectors.

3. A junction box for electric cables including in combination, a housing for enclosing conductors and having openings in a wall thereof, hollow insulators extending through said openings, a conductor terminal extending through each of said insulators and secured in fixed relation thereto, a stud for engaging an end of a cable, detachable connectors for joining said studs to said terminals, a plurality of insulating sleeves detachably secured to said insulators and extending over said detachable connectors, and a bell enclosing said sleeves and forming a liquid-tight seal with said housing.

4. A junction box for electric cables including in combination, a housing for enclosing conductors and having openings in a wall thereof, hollow insulators extending through said openings, a conductor terminal extending through each of said insulators and secured in fixed relation thereto, a stud for engaging an end of a cable, detachable connectors for joining said studs to said terminals, a plurality of insulating sleeves detachably secured to said insulators and extending over said detachable connectors, and a bell enclosing said sleeves and supporting the insulators in liquid-tight engagement with said housing.

5. A junction box including in combination, a housing having an opening in the side thereof, a tubular insulator extending through the opening, a terminal stud secured to the insulator having means on its inner end attachable to a conductor within the housing and having its outer end threaded, a stud threaded in the direction opposite to that of the first said stud and secured to a cable, a turn-buckle threaded in opposite directions for drawing the studs together and a bell extending over said turnbuckle and sealed in a liquid-tight seal with said cable and with housing about said opening.

SAMUEL J. SLOTSKY.